US009864906B2

(12) United States Patent
Eschbach et al.

(10) Patent No.: US 9,864,906 B2
(45) Date of Patent: Jan. 9, 2018

(54) METHOD AND SYSTEM FOR CREATING A VALIDATION DOCUMENT FOR SECURITY (71) Applicant: Xerox Corporation, Norwalk, CT (US)

(72) Inventors: Reiner Eschbach, Webster, NY (US); Edward N. Chapman, Rochester, NY (US); Saurabh Prabhat, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 212 days.

(21) Appl. No.: 14/818,845

(22) Filed: Aug. 5, 2015

(65) Prior Publication Data
US 2017/0039421 A1 Feb. 9, 2017

(51) Int. Cl.
*G06K 9/00* (2006.01)
*G06K 9/62* (2006.01)

(52) U.S. Cl.
CPC ................ *G06K 9/00483* (2013.01)

(58) Field of Classification Search
None
See application file for complete search history.

(56) References Cited

U.S. PATENT DOCUMENTS

| 7,740,281 B2 | 6/2010 | Gaffney et al. |
| 2006/0066907 A1 | 3/2006 | Nakata et al. |
| 2006/0089915 A1 | 4/2006 | Kantholy et al. |
| 2006/0282661 A1 | 12/2006 | True et al. |
| 2008/0025556 A1* | 1/2008 | Visan ................ G06K 9/38 382/100 |
| 2008/0179876 A1 | 7/2008 | Gaffney et al. |
| 2009/0279143 A1 | 11/2009 | St. Jacques, Jr. et al. |
| 2010/0128320 A1 | 5/2010 | Fan et al. |
| 2010/0235424 A1* | 9/2010 | Mori ................ G06K 9/00442 709/202 |
| 2011/0058228 A1* | 3/2011 | Inamoto ............ G06K 9/2063 358/448 |
| 2015/0043039 A1 | 2/2015 | Eschbach et al. |

* cited by examiner

Primary Examiner — Sean Conner
(74) Attorney, Agent, or Firm — Fox Rothschild LLP (57) ABSTRACT A document validation system receives a scan image of a document to be certified, analyzes the scan image to identify one or more characteristics of the scan image, and uses the identified characteristics to identify a security template. In response to a validation request, the system uses the identified security template to create a validation document that includes descriptive material comprising the location of one or more security elements on the document to be certified.

17 Claims, 6 Drawing Sheets

FIG. 6 though, for example

METHOD AND SYSTEM FOR CREATING A VALIDATION DOCUMENT FOR SECURITY

BACKGROUND

Security is an important requirement in many document printing applications. Since it is well known that a document itself could represent value; a motivation has existed for forgery. The issues of authentication and counterfeit deterrence can be important in many contexts where protecting the information (inherent value of the document) is often more important than protecting the physical document itself. Bills of currency, stock and bond certificates, credit cards, passports, birth certificates bills of lading, as well as many other legal documents (e.g., deeds, wills, etc.) all must be reliably authentic to be useful.

Hence, protection of both fixed data and variable data is often a requirement in many such documents to prevent counterfeiting and copying. The phrase "fixed data," as used in this disclosure, refers to data that remains constant over a plurality of documents. The phrase "variable data," as used in this disclosure, refers to data that varies between documents. Examples of documents containing both fixed and variable data include personalized checks, university diplomas, currency notes, deeds for land or buildings, vouchers, permits, tickets, and the like.

Prior art methods exist to secure such documents and their information or value by including various types of security elements in the documents. However, securing a document is only the first part because a protected document is effectively unprotected if the protection cannot be validated. The current techniques do not serve to verify the authenticity of a particular copy of the information. To validate a secured document, a user must be familiar with the location and identity of the security elements in the document. For example, a user cannot tell if a Russian currency note is real by analyzing the security elements embedded in the currency note if he is unfamiliar with the security elements and/or the bank note. The problem is exacerbated when a user has to validate less common documents such as documents printed on standard paper using standard printing technologies. The current methods of validation such as barcodes and warning boxes included on the document itself are static, inadequate, obtrusive, and prone to tampering or forgery. Furthermore, validation is even more problematic when all the documents are inherently different since they contain important variable data (such as seat numbers in the case of concert tickets).

The present disclosure therefore addresses instances where the issue is not merely whether the information is authentic, but rather whether the information is authentic (and unaltered), and the document itself an original by validating secured or protected documents.

SUMMARY

In an embodiment, a document validation system includes: a processor; a document output device such as a display device or a print device; and a non-transitory, computer-readable memory containing programming instructions. The programming instructions are configured to cause the processor to receive a scan image of a document to be certified, analyze the scan image to identify one or more characteristics of the document, and use the identified characteristics to identify a security template. When the system receives a validation request, it will use the identified security template to create a validation document that includes descriptive material comprising the location of one or more security elements on the document to be certified. The system will then cause the output device to output the validation document to a user.

Optionally, the system also may include a scanning device. If so, then the scanning device may receive the document to be certified and generate the scan image.

Optionally, when analyzing the scan image and identifying the security template, the system may: identify document content comprising one or more words, phrases, text formats, or data structures in the scan image; access a repository of security templates; and apply a template matching technique to select, from the repository, a security template that corresponds to the identified document content.

In another embodiment, when analyzing the scan image and identifying the security template, the system may identify a barcode in the scan image, access a repository of security templates and select a security template from the repository that corresponds to the identified barcode.

In another embodiment, when analyzing the scan image and identifying the security template, the system may identify document content comprising fixed data in the scan image, access a repository of security templates, and apply a template matching technique to select a security template from the repository that corresponds to the identified document content without reference to any variable data in the scan.

Optionally, when creating the validation document the system may use the security template to identify one or more security element locations in the scan image, analyze the identified security element locations to determine one or more content elements that should appear at each of the identified security element locations, and create the descriptive material to include each of the identified security element locations and the content elements that should appear at each of the identified security element locations.

In another embodiment, when creating the validation document the system may use the security template to identify one or more security element locations in the scan image, analyze the scan image to identify content that appears at each of the identified security element locations, and create the descriptive material to include each of the identified security element locations and the content elements that appear at each of the identified security element locations.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like. Various elements of an example of a computing device or processor are described below in reference to FIG. 6.

In this disclosure, the term "document processing system" refers to a system that includes one or more processors that are in electronic communication with a non-transitory, computer-readable memory containing programming instructions that, when executed, cause one or more of the processors to implement commands to perform document processing functions such as those described above and below.

In this document, the terms "communication" and "electronic communication" refer to the ability to transmit data via one or more signals between two or more electronic devices, whether through a wired or wireless network, and whether directly or indirectly via one or more intermediary devices.

"Multi-functional device" or "MFD" refers to a machine comprising hardware and associated software configured for printing, as well as at least one other function such as copying, facsimile transmitting or receiving, scanning, or performing other actions on document-based data. In this document, the term "print device" refers to a device that performs printing based on digital data, or a multi-functional device in which one of the functions is printing based on digital data. Examples include printers, copiers, plotters, and multi-function devices.

"Security element" refers to a mark printed on or otherwise applied to the substrate that verifies the authenticity of a document uniquely enabling a reader of the document to identify the document as originating from an authorized source. A security element may be an anti-counterfeiting mark that may include, for example, a micro text mark, a microgloss mark, a correlation mark, GlossMark® text, a fluorescent mark, raised seals, watermarks, an infrared mark and/or the like. In general, the security elements have features that cannot be photocopied or scanned by ordinary copying devices without altering the appearance of the security element. For example, data encoded as microtext may be so small that it is not within the resolution of ordinary copying devices, or if it is within the resolution of an ordinary copy device it may be so faint that it could not be copied without also substantially altering the appearance of the background or other information printed on the document.

A "secured document" refers to a document that contains at least one security element that verifies the authenticity of the document.

A "validation document" is a dynamic document created by the document processing system that may be used to convey information, to a user, regarding the authenticity of a secured document. A validation document may be outputted to the user in the form of an electronic document and/or hardcopy printable format.

In this document, "authenticating" or "validating" a document refers to determining whether the document is an authentic copy of the original document, i.e., whether the document has been altered while it was in the hard copy form. Alteration may occur due to deliberate effort or accidental events.

Figure 1:
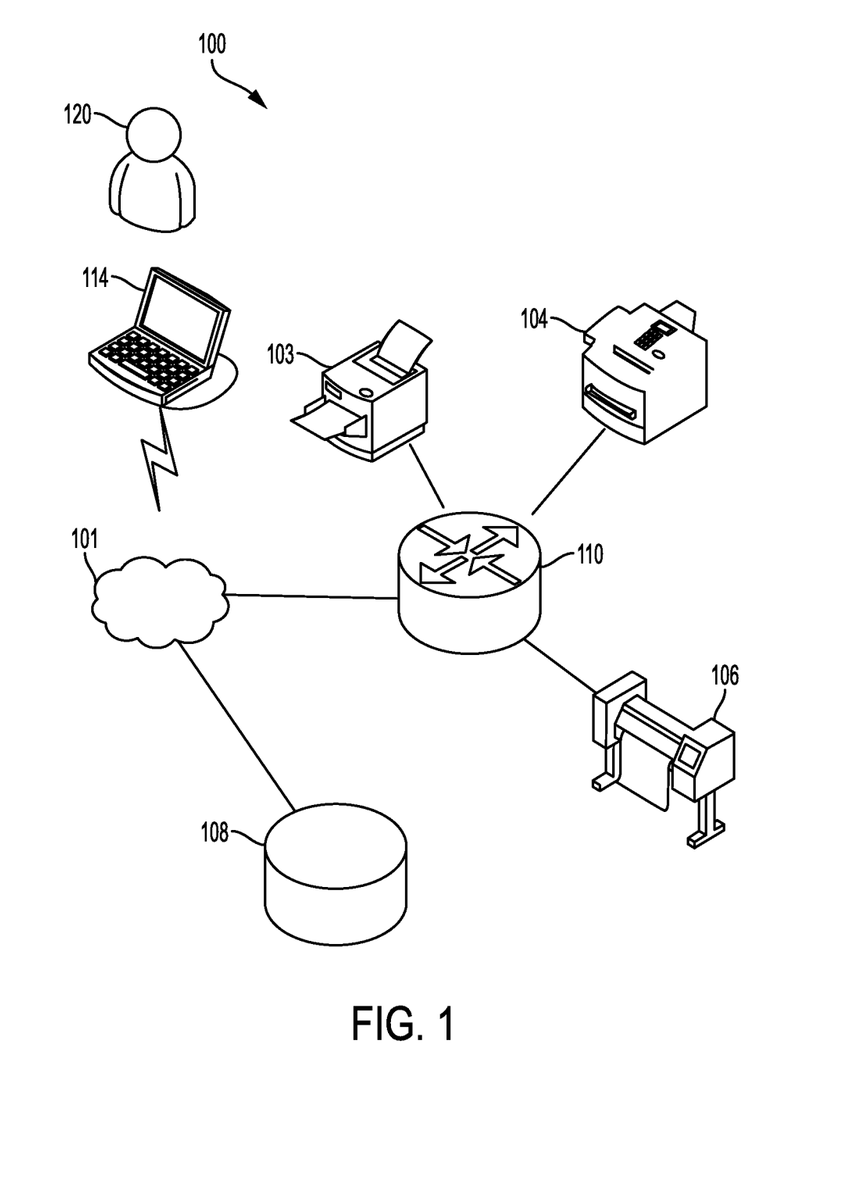
FIG. 1 illustrates various elements of equipment that may be included with and/or used by a document validation system

FIG. 1 illustrates an example of various hardware elements that may be used to implement the validation of a certified document 100. System 100 includes or is connected to one or more networks 101. As used in this document, the term "connected" refers to any configuration in which two or more devices may share data, programming instructions or other electronic communications with each other via wired and/or wireless communications. A user 120 accesses the system by one or more computing devices 114, which may execute programming instructions to implement the processes described below, or which may contain and execute software (such as a browser or other portal software) that allows a user to access the system as executed by an external computing device.

Any number of image capture devices (e.g., a card scanner, flatbed image scanner, MFD, or similar device) 103, and print devices 104 and 106 are connected to network 101. A networking device 110 such as a router may serve as a device to route information received via the network 101 to an appropriate print device. Networking device 110 may be any device capable of forwarding, routing, or otherwise transmitting packets and/or messages through a network, and any number of networking devices may be positioned within or on either side of network 101.

The system also may include one or more data storage facilities 108, such as a database that resides in a computer-readable memory and serves as a document repository, that includes various data files corresponding to documents, document templates and/or security templates (including security elements) that may be available for validation of a secured document. The data storage facilities 108 may include memory portions that are physically separate from the user's computing device 114 as shown, and/or they may include memory portions that are part of the user's computing device 114.

In certain embodiments, the data files may include copies of secure documents and/or document templates generated by an author from a computing device included in system 100, and sent to a recipient as an electronic document or a hard copy document. For example, a secured document may be mailed or e-mailed to a recipient with the expectation of receiving the secured document back at some point in the future, potentially with additional information added to the secured document. Examples may include bank checks, diploma certificates, tickets, permits, deeds, and other such documents sent to the respective issuing authority (primary recipient). In certain embodiments, the primary recipient may provide the system 100 with data regarding potential secondary recipients, which may include name, address, e-mail, and other contact and permission information. Such information may also be stored as data files in the data storage facilities 108.

The systems described in this document may include implementations that are embodied in a print device, an image capture device, a computing device with a connected print device, a software program a cloud based system, or any combination of these items.

There are many situations in which a user may require a secured copy of a document. A secured copy is a printed document that contains one or more security elements that serve as an indicator that the document was generated by an authorized entity. The authorized entity may be a federal, state or local government agency, or an entity to whom authorization is delegated, such as an automobile association or notary public. The system described below enables individuals who are not necessarily familiar with the location and/or identity of the security elements included in a document, in verifying the authenticity of the document.

Figure 2:
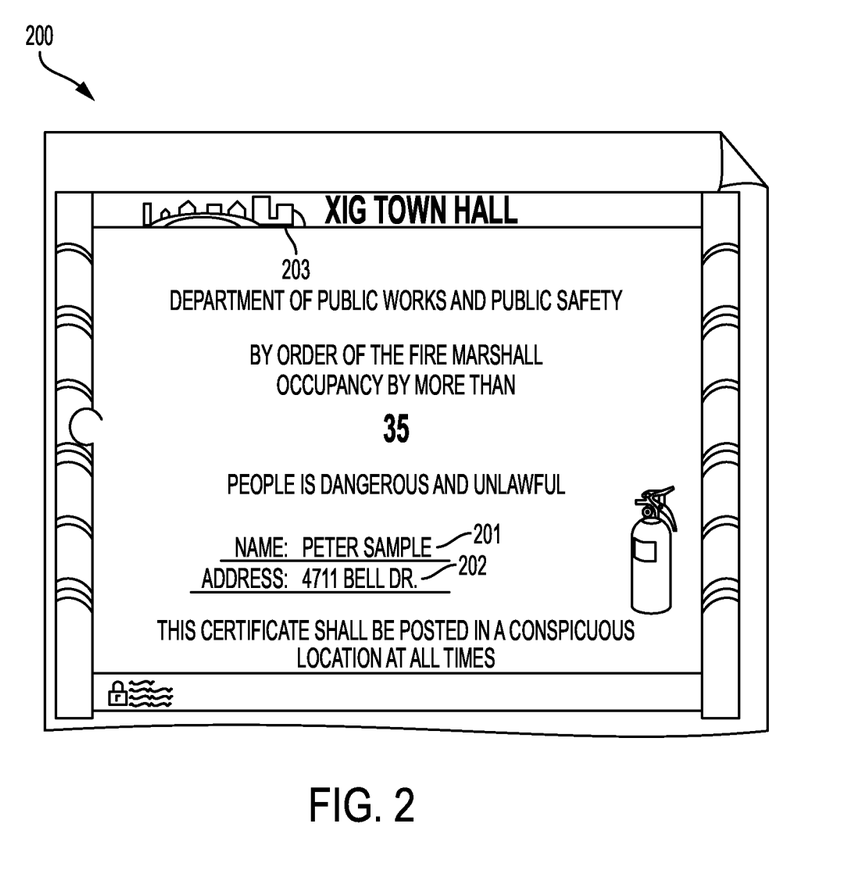
FIG. 2 illustrates an example of a printed, secured document with embedded security elements.

FIG. 2 illustrates an example of a printed, secured document 200 with embedded security elements, presented for validation to a verifier (user). The secured document 200 may include variable data, such as name 201 and address 202 of a secondary recipient. The secured document may also include fixed data, such as the name of the issuing authority (primary recipient) 203 and various security elements such as text or other images containing embedded correlation mark text, a pantograph, data printed with microgloss, hidden text, watermarks, and other such elements. A correlation mark is an example of a security mark that includes one or more elements that are invisible or hardly visible on a printed document. The hidden elements become visible when the document is viewed through a correlation mask that serves as a "key" to the correlation mark. Some or all of the security elements may not be easily discernible to the human eye, but they may be visible with one or more mechanical or other aids, such as magnification, oblique illumination, exposure to infrared light, or other aids. It should be understood that the document shown in FIG. 2 is merely illustrative of the types of secured documents and various elements that can be combined to form a security document.

Figure 3:
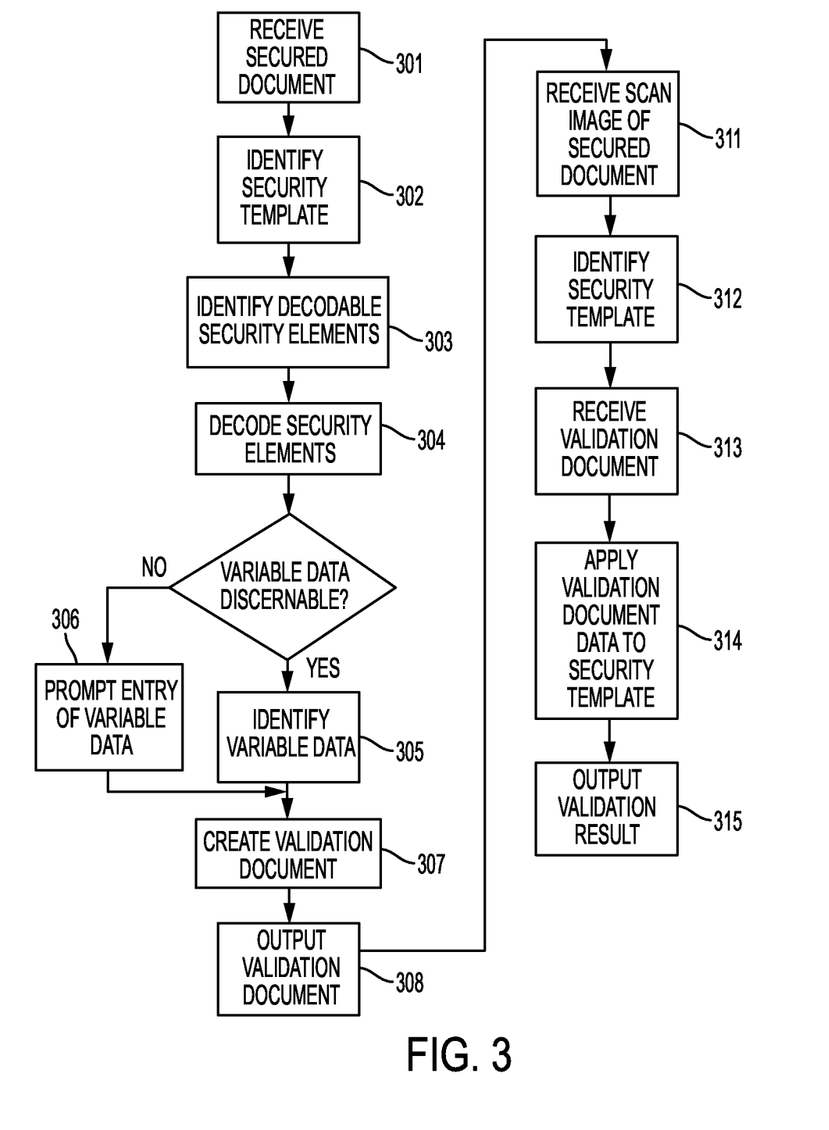
FIG. 3 illustrates a flow diagram illustrating an example of a document validation process.

FIG. 3 illustrates an example secured document validation process. The process may begin when a physical version of the secured document is received 301. The receiving 301 may be the initial generation of the document. Or, if the receiving 301 is done after distribution, then the document may be scanned at an image capture device such as an MFD and converted to an electronic format.

Figure 4:
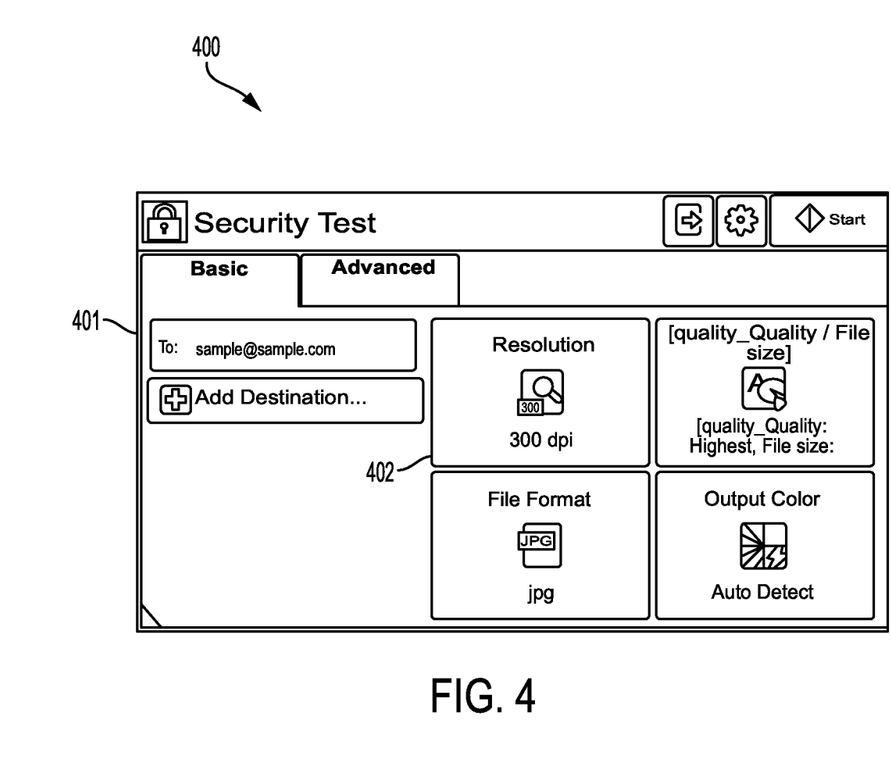
FIG. 4 illustrates an example of a validation user interface.

FIG. 4 shows a document scan interface 400 such as a security test screen that displays the options for scanning and/or validation of a document, including without limitation, destination and/or a recipient 401 and scan quality parameters 402. Examples of scan quality parameters may include, without limitation, a resolution of scan image, file format, file size, and output color. Example file formats include DOC, TXT, PDF, JPG, GIF, HTML, and XML, and the others known in the art supporting text, image, and/or multi-media content. Some or all of the features of the interface 400 may be preset. For example, in an embodiment, scan quality parameters may be preset such that the validation of the document is easier to perform and more reliable. For example, the resolution of the scan image may be preset to 300 dpi in JPG format, which may make it possible to decode a majority of security elements present in the validation document. In other embodiments, the system may enable a user to adjust some or all of the available options. For example, the system may enable a user to select a destination and/or a recipient of the scan image or validation results by any suitable means, such as email or another format. It should be noted that the interface 400 does not allow a user to select a category or type of a document for scanning and/or validation, thus further preventing forgery attempts by a secured document holder.

Although FIG. 4 illustrates a user interface as being implemented on an electronic display device, it is contemplated that it may be implemented in whole or in part by audio commands, such as by outputting an audible description of the scan quality parameters, and/or receiving voice commands and using any now or hereafter known process of recognizing and implemented the commands that are received.

Returning to FIG. 3, in step 301, when receiving the secured document, the system may receive a scan image of the secured document, in accordance with the user-defined and/or preset scan quality parameters. As explained above, the scan image may be received in a mailbox, a folder, or other similar destination, in response to a user selection. The scan image may be received by one or more electronic devices that are in electronic communication with one or more networked image capture devices. The scan image may include, without limitation, information such as document scan data, meta-data, and sender information.

The system may then identify a security template corresponding to the scan image of the secured document (step 302). In this step, the system may access a data set of available documents and/or security templates and compare the identifying metadata, rules or other criteria of each candidate template to various corresponding characteristics of the scan image. As discussed above, a document repository may include data files of secured documents, document templates and/or security templates generated by an author from a computing device included in the system. The system may process the secured documents to identify corresponding security templates. A security template can be a combination of words, phrases, text formats, data structure, security level associated with the template, and the like that generally describes one or more characteristics of the secured documents. Security templates are typically, although not necessarily, generated at the time of document creation. A document may have a single security template, or it may have multiple security templates that each apply to various subparts of the document.

In an embodiment, the system may extract a barcode from the scan image and use the information embedded within the barcode to identify a security template from the repository.

In some other embodiments, the system may analyze the scan image (including document scan data, meta-data, and sender information) of the secured document to identify whether the secured document matches any of the security templates. The system may search for the closest match using known template matching techniques. For example, the security template may be identified by analyzing the text content of the secured document. In some embodiments, the system may perform a character recognition process to convert bitmap or other graphically formatted documents into text content to be processed. Such character recognition processes are well known in the art. Alternatively and or additionally, a security template may be identified using known methods of image processing and pattern matching. In certain other embodiments, the system may identify a security template by indexing and searching for template tags, keywords, template descriptors or other such identifiers. The above techniques are provided by way of example only and other template identification techniques and/or combination of techniques are within the scope of this disclosure.

In some embodiments, identification of the security template may include analyzing all the information on the secured document and finding the closest match using one or more matching techniques as discussed above.

Additionally and or alternatively, the system may emphasize local attributes of the secured document over the global attributes for identifying a security template. For example, the existence of a large header may be an indication that the secured document is a type of a certificate, and the system may first search for a security template match in the certificate templates category. Similarly, if the size of the secured document is similar to that of currency bills, the system may search for a security template match in the currency bills category. The use of attributes is for illustration purposes only and other similar local attributes may be used for identifying the security template.

Optionally, the security templates also may include metadata identifying the types of document with which the templates may be used, and when accessing the data set to identify a security template, the system may require that the returned security templates only include those that may be used with the particular type of secured document. Optionally, some security templates may be mandated by a certifying organization, in which case the system may only search for a template from a set of pre-approved templates.

In certain embodiments, a secured document may match more than one security template. The system may then request the image capture device for additional metadata and/or other types of data in order to accurately identify one security template corresponding to the secured document. Examples of such data may include, without limitation, security elements that do not survive the scanning process, such as GlossMark or UV Fluorescence Marks.

If no matching security template is available, the system may determine that it cannot validate the document, and it may output this information to the user. However, if a security template is available, then after identifying the security template the system may then identify the decodable security elements included in the scan image (step 303). The system may analyze the security template corresponding to the secured document to identify, among other things, the security elements and their location.

The system may also identify whether or not the security elements are decodable based on information such as scan capability of the image capture device, export capability, scan quality parameters, and other similar information. For example, a holographic mark may not be decodable from a scan image. The system may then decode (step 305) the decodable security elements. Any known prior art decoding techniques may be used for decoding the security elements. For example, the system may decode a correlation mark included in the secured document by using a key or by estimating the frequency of the printed correlation mark, generating a decoding template using the estimated frequency, and applying the template to an image of the correlation mark to detect hidden content. In certain embodiments, the system may obtain a decryption key for decoding a security element. The above decoding techniques are by way of example only and any other techniques known in the art are within the scope of this disclosure.

The system may then perform a character recognition process to identify variable data (step 305) from the variable data fields on the secured document. If the system is not able to discern all of the variable data, it may generate and output a prompt (step 306) that asks the user to input the undiscernible variable data, and it will then receive the variable data from the user via a user interface in response to the prompt.

The system may add the identity, location, decoded information for the security elements, and the variable data to the metadata for the secured document, which may then be used in the validation of the secured document and creation of the validation document, as discussed below.

In step 307, the system may create a validation document based on the security template and the metadata for the secured document. As discussed above, a validation document is a dynamic document created for the validation of a secured document.

Figure 5:
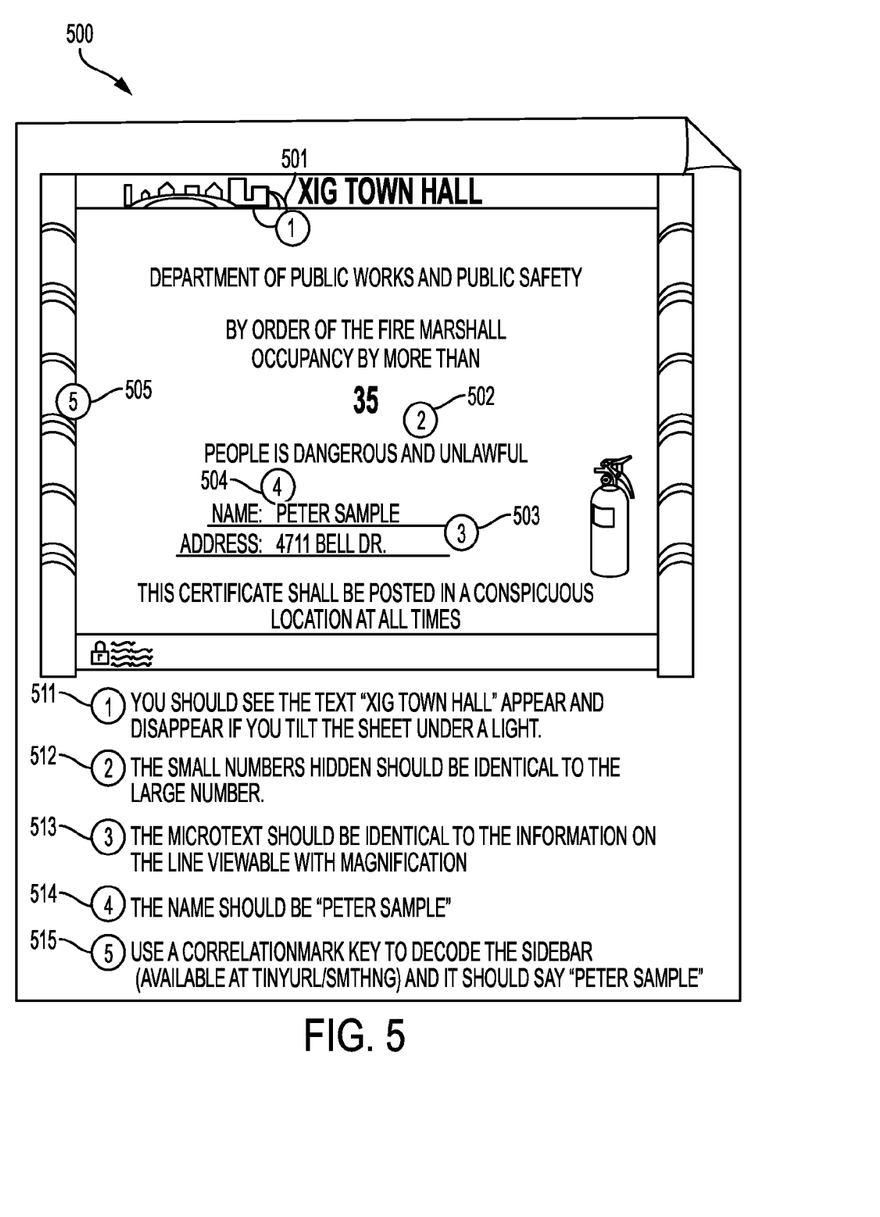
FIG. 5 illustrates an example of a validation document created in accordance with the principles of this disclosure.

As shown in FIG. 5, a validation document 500 may include annotations 501 with local identifiers, 502, 503, 504, 505, and 506 for the static data (including security elements) and/or the variable data. Thus, at some point in time after a validation document is created, the system may use the identified security template from a validation document to determine if the data and elements of a secured document are authentic. Additionally and/or alternatively, the system may provide instructions to the user such that the user may determine whether the data and elements are authentic, where the system cannot decode the security elements or cannot determine the authenticity of the variable data.

The system may execute one or more rules to generate the unique dynamic validation document corresponding to the secured document. For example, the rules may include rules to retrieve identifying information about the source of the document (such as a user name or other identifier, certificate holder name, an office identifier, or a requesting entity identifier), the time and/or date of printing, a unique serial code, icon, image or seal, and rules to cause the identifying information to be included in the validation document in accordance with rules of the identified security template. In some embodiments, the rules may cause the system to use the security template to identify the security elements, and their location.

For example, the security template may include information relating to the location and types of various security elements in the document. The system may then analyze the document content at those locations and populate the validation document with the analyzed content in association with the known security element locations. An example of this is shown in FIG. 5, where the security template indicates that a header element 501 will contain certain text, and the system may use any suitable document scanning technique to identify the text at that location, or the template may require certain text at that location. The validation document may then include a description 511 of the location and content that corresponds to that security element. Similarly, additional validation descriptions 512-513 describing the location and values of various security elements are also shown in validation document 500. Optionally, the system may create the validation document automatically without requiring any user input other than the initial validation document creation request.

In some embodiments, the rules may cause the system to extract actual data or information that should be present on the secured document (for example, from stored original document copy) and use suitable techniques such as character recognition to verify the data on the secured document. In some other embodiments, the rules may cause the system to create annotations that may instruct a user to decode security elements. Examples with respect to FIG. 5 are discussed below.

As shown in FIG. 5, from the security template, the system may infer that the original document used microgloss (1) which cannot be scanned and/or copied and thus cannot be decoded by the system. The system therefore includes an annotation 502 that may enable the user to verify the microgloss on the secured document by including information regarding the steps and output of the verification process. The location of the microgloss may be marked using local identifiers on a copy of the document.

Further, as shown in FIG. 5, the system may infer from the security template that the original document used microtext in the large number (2) that is repeating the number. Since, microtext cannot be copied and/or scanned and thus cannot be decoded by the system, the system may explain the connection between macro and micro information in the validation document as annotation 503, such that the user may verify the authenticity of the microtext. The location of the Microtext may be marked using local identifiers on a copy of the document. In certain embodiments (not shown here), the system may use character recognition techniques (discussed above) to read the macro text ("35") and simply instruct the user to verify whether the microtext also reads "35."

Similarly, the system may infer from the security template that the original document used microtext in the thin lines (3) that are variable and contain the same information as the large font above the lines. Since, microtext cannot be copied and/or scanned and thus cannot be decoded by the system, the system may explain the connection between macro and micro information in the validation document as annotation 504, such that the user may verify the authenticity of the macrotext (i.e., the non-microtext).

The system may also extract the name of the certificate holder, if available, from the data repository and may either instruct the user to verify the name (505), and/or may use character recognition techniques to verify the name automatically. As discussed above, the name of the certificate holder may be available in the data repository if the original certificate was created using a computing device included in the system. In certain embodiments, the name of the certificate holder and/or its location may be encoded as a security element on the secured document and the system may decode and/or provide instructions to the user to decode the security element and recover the name.

Additionally the system may identify the location of a correlation mark in the secured document (in this case from the two gray sidebars), and decode the correlation mark information as discussed above. The system may include the decoded information on the validation document 506. In certain embodiments, the system may provide the user with instructions to decode the correlation mark. Examples of such instruction may include, without limitation, location of a correlation mark key.

It should be noted that the validation document as shown in FIG. 5 is merely illustrative of the types of validation documents and various annotations, tags, and verifications that can be combined to form a validation document. The validation document may also include other metadata received from the user and/or extracted from the image scan, as discussed above.

Returning to FIG. 3, the system may output (in step 308) the validation document to the user (verifier) as an electronic document and/or a hardcopy document. In some embodiments, the system may display and/or print the validation document on the MFD that captured the scan image of the secured document. In some embodiments, the system may display and/or print the validation document on a computing device or print device other than the MFD that captured the scan image of the secured document.

In certain embodiments, the validation document outputted to the user may include at least one security element. The security element may be selected based on the mode of outputting the validation document, level of security desired, and other such information.

The user may then verify the authenticity of the secured document using the validation document. It should be noted that unlike a static print contained on the secured document itself, a dynamic validation document cannot be forged or altered by a document holder because it is created by a verifier at the time of authentication and is not a part of the document itself. Examples of how this may be performed are illustrated in the not-yet-described elements of FIG. 3. The system receives a scan that is an image file of a certified document 311. The scan may be generated by a scanning device of the system, or the system may receive the scan as a data file. The system may identify a security template 312 for the certified document using by analyzing the scan using processes such as those described above for generating the validation document.

The system may prompt a user to enter a validation document into the system and thus cause the system to receive the validation document 313. The input and receipt may be via a scanning device, via an electronic file transfer, by receipt of a user selection of one of a set of candidate validation documents that are displayed on a user interface, or by some other user input means. After the system receives the validation document, it may apply data from the validation document to the security template 314 by: (i) extracting from the identified security template the location of one or more security elements on the certified document; (ii) analyzing the validation document to identify expected content that should appear on the certified document at the identified security element locations; (iii) analyzing the scan of the certified document to identify actual content that appears on the certified document at the identified security element locations; and (iv) determining whether the expected content matches the actual content. The system may the output a report of the validation to the user 315. The validation report may include a description or report of whether or not the scanned document contains the expected security elements.

It is notable that when identifying the security element locations, the system need not necessarily identify all security element locations in the document and/or report all comparisons of actual vs. expected content to the user. Some security element locations may include metadata that serves as a command to the system that the locations should not be described in a validation report, while other security elements may be obscured to not be detectable by the system.

Figure 6:
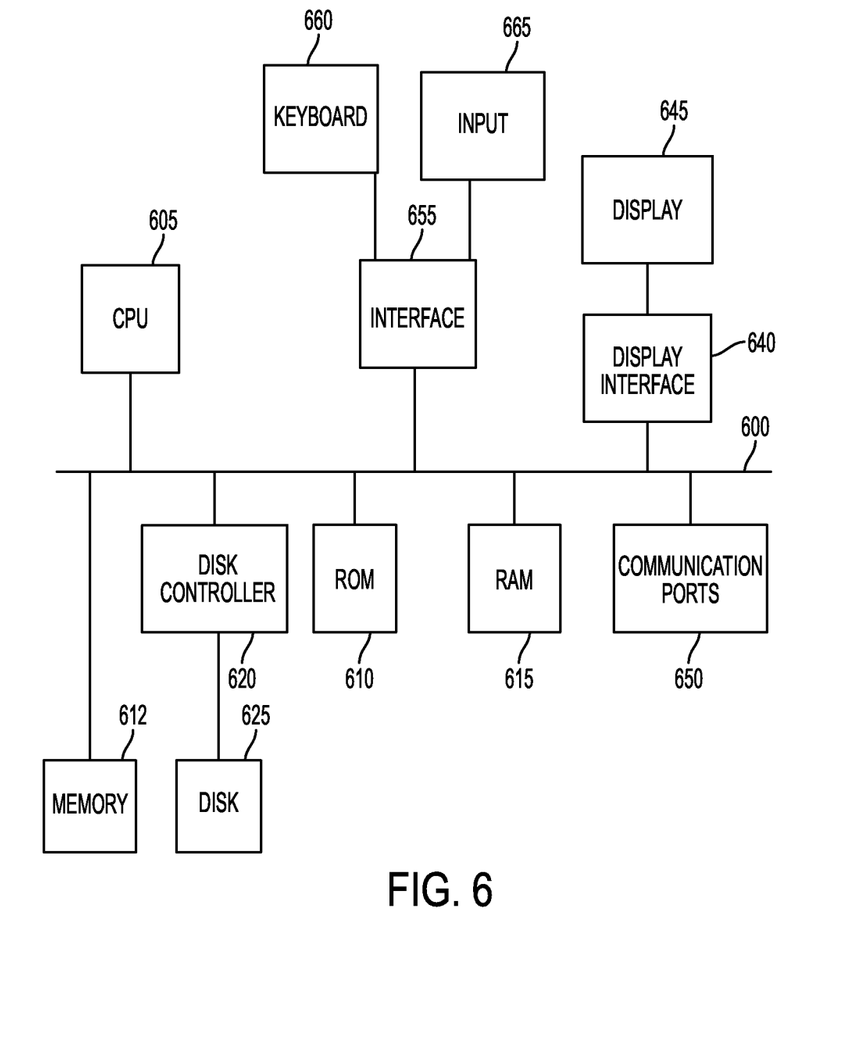
FIG. 6 is a block diagram illustrating various elements of an example of a computing device.

FIG. 6 depicts a block diagram of an example of internal hardware that may be used to contain or implement program instructions, such as the process steps discussed above, according to embodiments. A bus 600 serves as an information highway interconnecting the other illustrated components of the hardware. CPU 605 represents one or more processors of the system, performing calculations and logic operations required to execute a program. CPU 605, alone or in conjunction with one or more of the other elements disclosed in FIG. 7, is an example of a processing device, computing device or processor as such terms are used within this disclosure. Read only memory (ROM) 610 and random access memory (RAM) 615 constitute examples of memory devices or processor-readable storage media.

A controller 620 interfaces with one or more optional tangible, computer-readable memory devices 625 to the system bus 600. These memory devices 612 may include, for example, an external or internal disk drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium 625 such as a compact disk, a digital disk, flash memory, a memory card, a USB drive, an optical disc storage medium, such as a Blu-ray™ disc, and/or other recording medium controlled via a disk controller 620.

An optional display interface 640 may permit information from the bus 600 to be displayed on the display 645 in audio, visual, graphic or alphanumeric format. Communication with external devices, such as a printing device, may occur using various communication ports 650. A communication port 650 may be attached to a communications network, such as the Internet or an intranet.

The hardware may also include an interface 655 which allows for receipt of data from input devices such as a keyboard 660 or other input device 665 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A document validation system, comprising:
   a processor;
   a document output device comprising a display device or a print device; and
   a non-transitory, computer-readable memory containing programming instructions that are configured to cause the processor to:
      receive a scan image of a document to be certified, wherein the scan image is an electronic file supporting text, image and/or multi-media content,
      analyze the scan image to identify one or more characteristics of the document,
      access a repository of security templates and identify, from the repository, a security template corresponding to the document using the identified characteristics,
      analyze the security template and the scan image to identify one or more security elements in the document, along with the location of each security element,
      receive a validation request,
      use the identified security template to create a validation document that identifies the one or more security elements and includes descriptive material comprising the location of each of the one or more security elements on the document to be certified, and
      cause the output device to output the validation document to a user,
      wherein the instructions to create the validation document comprise instructions to: refer to the security template to identify the location of each of the one or more security elements, analyze content of the document to be certified at the location of each of the one or more security elements to determine one or more content elements that should appear at each of the identified security element locations, and populate the validation document such that the descriptive material includes the content elements that should appear at the location of each security element.

2. The system of claim 1, further comprising:
   a scanning device; and
   additional programming instructions that are configured to cause the processor to command the scanning device to receive the document to be certified and generate the scan image.

3. The system of claim 1, wherein the instructions to analyze the scan image and identify the security template comprise instructions to:
   identify document content comprising one or more words, phrases, text formats, or data structures in the scan image; and
   apply a template matching technique to select, from the repository, a security template that corresponds to the identified document content.

4. The system of claim 1, wherein the instructions to analyze the scan image and identify the security template comprise instructions to:
   identify a barcode in the scan image; and
   select, from the repository, a security template that corresponds to the identified barcode.

5. The system of claim 1, wherein the instructions to analyze the scan image and identify the security template comprise instructions to:
   identify document content comprising fixed data in the scan image; and
   apply a template matching technique to select, from the repository, a security template that corresponds to the identified document content without reference to any variable data in the scan.

6. The system of claim 1, wherein the instructions to create the validation document also comprise instructions to:
   for each of the security elements, determine whether the element is decodable; and
   for each security element that is determined to be decodable, decode the security element to detect the content elements.

7. A method of creating a validation document for a document validation system, the method comprising:
   by a processor, executing programming instructions that are configured to cause the processor to implement a validation document generation process comprising:
      receiving a scan image of a document to be certified, wherein the scan image is an electronic file supporting text, image and/or multi-media content,
      analyzing the scan image to identify one or more characteristics of the document,
      accessing a repository of security templates and identifying, from the repository, a security template corresponding to the document using the identified characteristics,
      analyzing the security template and the scan image to identify one or more security elements in the document, along with the location of each security element,
      receiving a validation request,
      using the identified security template to create a validation document that identifies the one or more security elements and includes descriptive material comprising the location of each of the one or more security elements on the document to be certified, and causing the output device to output the validation document to a user, wherein creating the validation document comprises: referring to the security template to identify the location of each of the one or more security elements, analyzing content of the document to be certified at the location of each of the one or more security elements to determine one or more content elements that should appear at each of the identified security element locations, and populating the validation document such that the descriptive material includes the content elements that should appear at the location of each security element.

8. The method of claim 7, further comprising:
by a scanning device, receiving the document to be certified and generating the scan image.

9. The method of claim 7, wherein analyzing the scan image and identifying the security template comprise:
identifying document content comprising one or more words, phrases, text formats, or data structures in the scan image; and
apply a template matching technique to select, from the repository, a security template that corresponds to the identified document content.

10. The method of claim 7, wherein analyzing the scan image and identifying the security template comprise:
identifying a barcode in the scan image; and
selecting, from the repository, a security template that corresponds to the identified barcode.

11. The method of claim 7, wherein analyzing the scan image and identifying the security template comprise:
identifying document content comprising fixed data in the scan image; and
applying a template matching technique to select, from the repository, a security template that corresponds to the identified document content without reference to any variable data in the scan.

12. The method of claim 7, wherein creating the validation document also comprises:
for each of the security elements, determining whether the element is decodable; and
for each security element that is determined to be decodable, decoding the security element to detect the content elements.

13. A document validation system, comprising:
a processor;
a scanning device;
programming instructions that are configured to cause the scanning device to receive a document to be certified and generate a scan image of the document, wherein the scan image is an electronic file supporting text, image and/or multi-media content;
a document output device comprising a display device or a print device; and
a non-transitory, computer-readable memory containing programming instructions that are configured to cause the processor to:
analyze the scan image to identify one or more characteristics of the document,
access a repository of security templates and identify, from the repository, a security template corresponding to the document using the identified characteristics,
analyze the security template and the scan image to identify one or more security elements in the document, along with the location of each security element,
receive a validation request,
in response to the validation request, use the identified security template to create a validation document that identifies the one or more security elements and includes descriptive material comprising the location of each of the one or more security elements on the document to be certified, and
cause the output device to output the validation document to a user,
wherein the instructions to create the validation document comprise instructions to: refer to the security template to identify the location of each of the one or more security elements, analyze content of the document to be certified at the location of each of the one or more security elements to determine one or more content elements that should appear at each of the identified security element locations, and populate the validation document such that the descriptive material includes the content elements that should appear at the location of each security element.

14. The system of claim 13, wherein the instructions to analyze the scan image and identify the security template comprise instructions to:
identify document content comprising one or more words, phrases, text formats, or data structures in the scan image; and
apply a template matching technique to select, from the repository, a security template that corresponds to the identified document content.

15. The system of claim 13, wherein the instructions to analyze the scan image, identify one or more characteristics of the document, and identify the security template comprise instructions to:
identify a barcode in the scan image; and
select, from the repository, a security template that corresponds to the identified barcode.

16. The system of claim 13, wherein the instructions to analyze the scan image, identify one or more characteristics of the document, and identify the security template comprise instructions to:
identify document content comprising fixed data in the scan image; and
apply a template matching technique to select, from the repository, a security template that corresponds to the identified document content without reference to any variable data in the scan.

17. The system of claim 13, wherein the instructions to create the validation document also comprise instructions to:
for each of the security elements, determine whether the element is decodable; and
for each security element that is determined to be decodable, decode the security element to detect the content elements.

* * * * *